Patented July 14, 1942

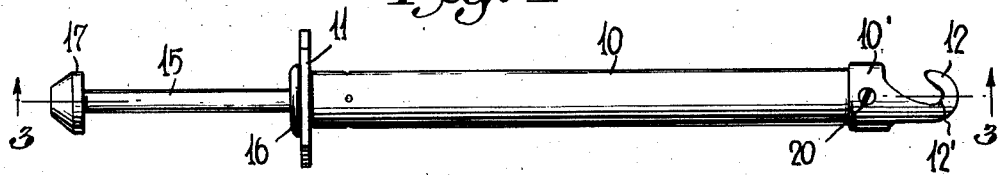
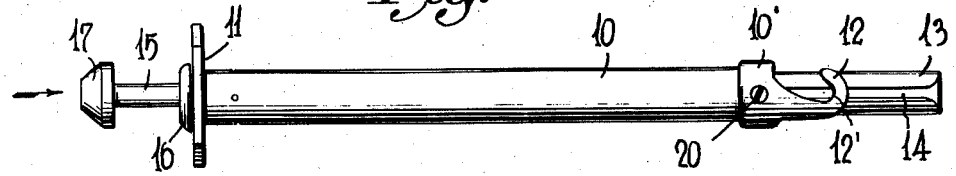
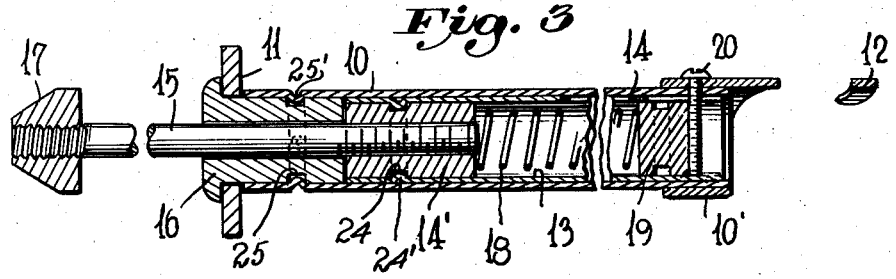
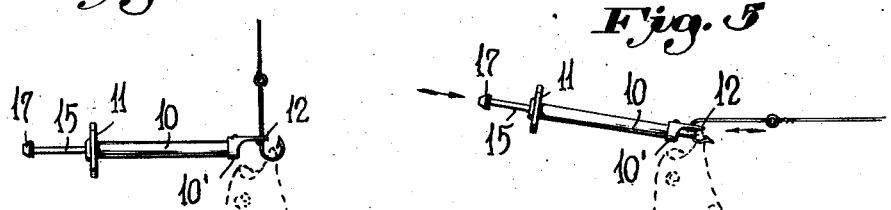
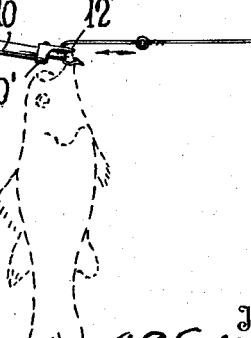
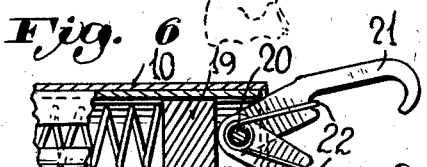
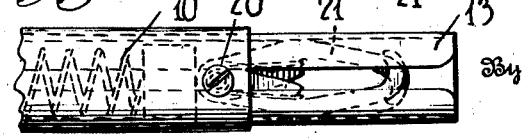

2,289,810

UNITED STATES PATENT OFFICE 2,289,810

FISHHOOK EXTRICATOR

Andrew P. Tallmadge, Washington, D. C.

Application January 16, 1941, Serial No. 374,766

9 Claims. (Cl. 43—29)

This invention relates to fish hook extricators, and has for its principal object, the facilities for removing hooks from fish which have become lodged either in the jaws or gullet of the fish.

Another object of this invention is to provide a self contained means to carry out the extricating process without the necessity of holding or contacting the fish with the operator's hands, thus avoiding hand contact with objectional species that are sometimes unintentionally hooked.

Another object of this invention is to aid in the successful restoration of under legal size fish to their natural element without the detrimental effect of applying a hand hold to the fish in the extricating operation, which is often fatal to such successful restoration.

Another object of this invention is to provide a fish hook extricator which can be readily carried on the person and which can be instantly applied in a manner to remove the fish from the hook.

With these objects in view, this invention consists of a device of the character and for the purposes stated, embodying novel details of arrangement of parts substantially as described and claimed, and as shown in the drawing, in which, Fig. 1 shows a plan and Fig. 2 a side elevation of a preferred form of extricator.

Fig. 3 shows a longitudinal section, with parts broken away, of the device taken on lines 3—3 of Fig. 1.

Fig. 4 represents a view of the device engaging a fish hook on which is a diagrammatical outline of a fish.

Fig. 5 is a similar view to Fig. 4, with the extricating means extended to contact the fish, preparatory to forcing the fish from the hook.

Figs. 6 and 7 show modifications of the invention.

Referring to the drawing, the fish hook extricator comprises an elongated tubular housing 10, preferably constructed of non-ferrous metal, having positioned at one end thereof a rotatably mounted shield 11, adapted to be grasped by the fingers of the operator.

At the opposite end of the tubular housing 10, there is detachably mounted the collar 10'. Extending from the collar 10' and concentric with the tubular housing 10, is the curved finger 12 that tapers toward its outer terminal and forms a depression 12' into which the curved portion of a fish hook will gravitate when suspended therein. The collar 10' with the finger 12 extending therefrom, is made readily detachable to permit a replacement should the finger 12 become inoperative.

Positioned within the tubular housing 10, and adapted for reciprocal movement therein, is the tubular plunger 13, having formed in the side wall thereof, the longitudinal slot 14, extending from one end thereof, to its central portion. The opposite end of the tubular plunger 13, is closed with the filler plug 14'. The filler plug 14' is provided with a recess 24, into which is positioned the detent 24' formed in the tubular plunger 13, adapted to hold the filler plug 14' in a fixed position within the tubular member 13. Extending from the filler plug 14', and screw threaded therein is the push rod 15, which is slidably disposed within the housing 10, and extends in part exteriorly of the housing 10, through the bushing 16. The bushing 16 is provided with a recess 25 into which is positioned the detent 25', formed in the tubular housing 10, adapted to hold the bushing 16, in a fixed position within the tubular housing 10.

Mounted on the extended end of the rod 15, is the knob 17, adapted for hand contact by the operator in carrying out the operations of this device.

Positioned within the tubular plunger 13, is a helical compression spring 18, with the inner end thereof abutting against the stop plug 19, and with its outer end contacting the stop plug 19. The stop plug 19, is freely positioned within the plunger 13, and is held in fixed relation to the tubular housing 10, by the extended end of the screw member 20, which is removably screw threaded through the collar 10' and the tubular housing 10, and registers with the slot 14 in the tubular plunger 13.

It will be obvious to those skilled in the art, that in the foregoing arrangement of parts, the slotted tubular plunger 13, may have reciprocal movement within the tubular housing 10, and that by an inward pressure on the knob 17, the outer end of the slotted tubular plunger 13, may be made to project a substantial distance beyond the curved finger 12. In this movement of the member 13, the helical spring 18, will be compressed and held in a retracted position until pressure is released on the knob 17, when upon release of such pressure, the tubular member 13, will assume its normal position within the housing 10.

It will also be obvious, that as pressure is exerted on the knob 17, the tubular plunger 13, will move toward the curved finger member 12, with the slot 14 therein maintained in a fixed radial plane with respect to the tubular housing member 10, by the guiding influence of the screw member 20, maintained in the slot 14, and as the tubular member 13, continues to move toward the curved finger 12, the slot therein, will straddle a fish hook engaged in the curved finger 12, until the fish holding portion of the hook is positioned within the tubular plunger 13, and a fish attached to the hook, will in this operation be detached from the hook, while the hook remains stationary in its keeper. With the hook so housed within the tubular plunger, it will be prevented from becoming re-engaged during the removal of the extricator from contact with the fish.

In Figs. 6 and 7, is shown a modification of the invention wherein provision is made for engaging means to grasp and maintain a hold on the fish hook during the movement of the detaching plunger through the zone occupied by the fish hook.

I provide the grasping and holding means by two companion jaws 21 and 21' mounted for swinging movement on the screw member 20. The jaws 21 and 21' are normally held with their swinging ends spaced apart by the spring 22 positioned in coiled relation around the screw member 20, with each of its projecting ends exerting a bearing on one of the companion jaws 21 and 21'.

In the forward movement of the plunger 13, contact will be made between the outer end of the tubular plunger 13, and the outer shoulders of the jaws 21 and 21', and as the movement of the plunger 13 continues, the swinging ends of the jaws 21 and 21', will be moved toward one another to form a closure around a fish hook, and as the plunger continues in its movement, the swinging jaws with the fish hook grasped therein, will become completely housed within the tubular plunger 13.

It will be obvious that when this position has been reached by the jaws and the fish hook positioned therebetween, that a fish attached to the hook will be forced off the hook by the end of the tubular plunger 13.

In the operation of the extricator of the form shown in Figs. 1 to 5 inclusive, the same is applied to the fish hook with the one hand of the operator, while the fish is held suspended with the other hand by the line leading to the hook as shown in Fig. 4.

With the operator's fingers clasped over the shield member 11, and the plunger knob member 17, residing in the palm of the operator's hand, the manual compression of the member 17 between the palm of the hand and the fingers of the operator clasped over the shield 11, will cause the tubular plunger 13, to move to the position contacting the fish as shown in Fig. 5.

The shield member 11, is mounted on the housing 10, to allow rotation of the housing member to automatically adjust the position of the hook engaging means.

When the movement of the plunger 13, has been carried out to separate the fish from the hook, the hook will have become positioned within the tubular plunger 13, and no further contact between the hook and any part of the fish can occur to re-engage the hook, during the withdrawal of the extricator.

In the operation of the extricator of the form shown in the modification disclosed in Figs. 6 and 7, the procedure is substantially the same as above indicated, with the additional feature of the functioning of the closure of the members 21 and 21' around the fish hook to hold it therebetween during the operation of extracting the fish therefrom.

It will be seen that I have provided a fish hook extricating device that is relatively simple in construction, inexpensive to manufacture, and effective in performing the functions for which it is designed.

I reserve the right to make minor changes in the construction of the various parts of the device as shown in the drawing without departing from the spirit of the invention, the scope of which is set forth in the appended claims.

What I desire to secure by Letters Patent is:

1. A fish hook extricating implement, comprising an elongated tubular housing, a collar detachable mounted on and concentric with said housing, a curved finger on said collar, a tubular plunger disposed for reciprocal movement within said housing, said plunger having a longitudinal slot in the side wall thereof adapted to straddle a fish hook retained in said curved finger, and means to convey reciprocal movement to said plunger.

2. A device of the character described, consisting of a tubular housing, a curved finger at one end of said housing, a tubular plunger slidably positioned within said housing and having a path of travel extending past said finger in a line substantially parallel with the plane occupied by said finger, said plunger having a longitudinal slot adapted to straddle a fish hook lodged in said finger and means to actuate movement of said plunger.

3. A fish hook extricating device, comprising an elongated tubular housing, a collar detachably mounted on said housing with a curved finger projecting forwardly and extending to one side of the medial line of and concentric with said housing comprising a fish hook keeper, a tubular plunger longitudinally slidably disposed within said housing having one end slotted to straddle a fish hook positioned within said keeper, and means to actuate movement to said plunger.

4. A device of the character described, comprising a tubular housing, a fish hook keeper mounted on one end of the housing, a tubular plunger comprising a hook disengaging means slidably mounted within said housing formed with a longitudinal slot adapted to straddle a fish hook retained in said keeper, means for maintaining the slot in contacting alignment with the hook, and means for conveying sliding movement to said plunger.

5. A device of the character described, comprising an elongated tubular housing having a cross member rotatively mounted at one end thereof and a fish hook engaging keeper detachably mounted adjacent the other end thereof, a tubular plunger longitudinally slidably disposed within said housing and having a handle at one end thereof projecting exteriorly of the housing and a longitudinal slot formed in the other end, guiding means extending from said housing to maintain said slot in an aligned position to straddle a fish hook lodged in said keeper, and a helical compression spring encased within said tubular plunger adapted to be compressed upon the movement of handle.

6. A fish hook extricator, comprising a tubular housing having a cross pin mounted therein, companion swingable members depending from said pin, and means to maintain the outer terminals thereof normally in a spaced apart relation, and means to successively actuate the swinging members to form a closure around a fish hook and to disengage a fish therefrom.

7. A fish hook extricator, comprising a tubular housing having a radially positioned pin mounted on the side wall thereof, a tubular plunger slidably mounted for reciprocal movement within said housing and formed with a longitudinal slot adapted to straddle said pin, companion swingable members depending from said pin, means to yieldingly maintain the outer terminals of said swingable members spaced apart, and means to successively actuate the swinging members to form a closure around a fish hook and to disengage a fish therefrom by the movement of the tubular plunger.

8. A fish hook extricator of the character described, comprising a tubular housing having a radially positioned pin mounted in the side wall thereof, a tubular plunger mounted for reciprocal movement within said housing and formed with a longitudinal slot adapted to straddle said pin, companion swingable members depending from said pin, means to yieldingly space apart the outer terminals of said swingable members, and means to successively actuate the swinging members to form a closure around a fish hook and to house the swinging members with the fish hook clasped therebetween within the tubular plunger to strip a fish from the hook.

9. A fish hook extricator comprising an elongated tubular housing having a radially disposed pin therein supporting companion jaws swingably mounted to grasp a fish hook therebetween, a tubular plunger longitudinally slidably disposed within said housing formed with a longitudinal pin straddling slot in one end thereof, a helical compression spring encased within said plunger and adapted to maintain the jaws in engaging position to span a fish hook, and means for actuating said jaws at a point remote therefrom.

ANDREW P. TALLMADGE.